United States Patent [19]

Rhodes et al.

[11] Patent Number: 4,854,244
[45] Date of Patent: Aug. 8, 1989

[54] TRANSIT RAIL DEICING SYSTEM

[75] Inventors: Thomas R. Rhodes; Thomas J. Brennan, both of Tulsa, Okla.

[73] Assignee: General Signal Corporation, Stamford, Conn.

[21] Appl. No.: 187,944

[22] Filed: Apr. 29, 1988

[51] Int. Cl.4 .............................................. E01B 7/24
[52] U.S. Cl. ..................................... 104/279; 246/428
[58] Field of Search ................ 104/279, 280; 246/428; 248/71-73

[56] References Cited

U.S. PATENT DOCUMENTS

| | | | |
|---|---|---|---|
| 814,671 | 3/1906 | Burns | 104/279 |
| 2,090,156 | 1/1936 | Scholz | 104/279 |
| 2,091,849 | 8/1937 | Finlayson | 246/428 |
| 2,644,657 | 7/1953 | White, Jr. | 246/428 |
| 4,429,845 | 2/1984 | Stover et al. | 104/280 X |

FOREIGN PATENT DOCUMENTS 543331  2/1942  United Kingdom ................ 246/428

Primary Examiner—Robert B. Reeves
Assistant Examiner—Dean J. Kramer
Attorney, Agent, or Firm—Robert R. Hubbard; Paul H. Johnson

[57] ABSTRACT

A system for use with a rail for carrying a moving conveyance, the rail having a web portion, a base portion and an increased width top portion, the system serving to heat the rail top portion to decrease the accumulation of snow and ice thereon, including studs secured to the rail web portion, such as by spot welding, at spaced intervals along the length of the rail, a series of elongated carrier members each defined in cross-section normal the length thereof by an upper trough forming portion and a lower clamping portion, the clamping portion having openings spaced along the length thereof in register with and arranged to receive the studs affixed to the rail web portion and being positionable in a first position wherein the trough forming portion is exposed to receive a heating cable therein and in a second position wherein the heating cable is in close proximity to the top rail portion whereby heat supplied by the cable is readily transmitted to the rail top portion.

18 Claims, 4 Drawing Sheets

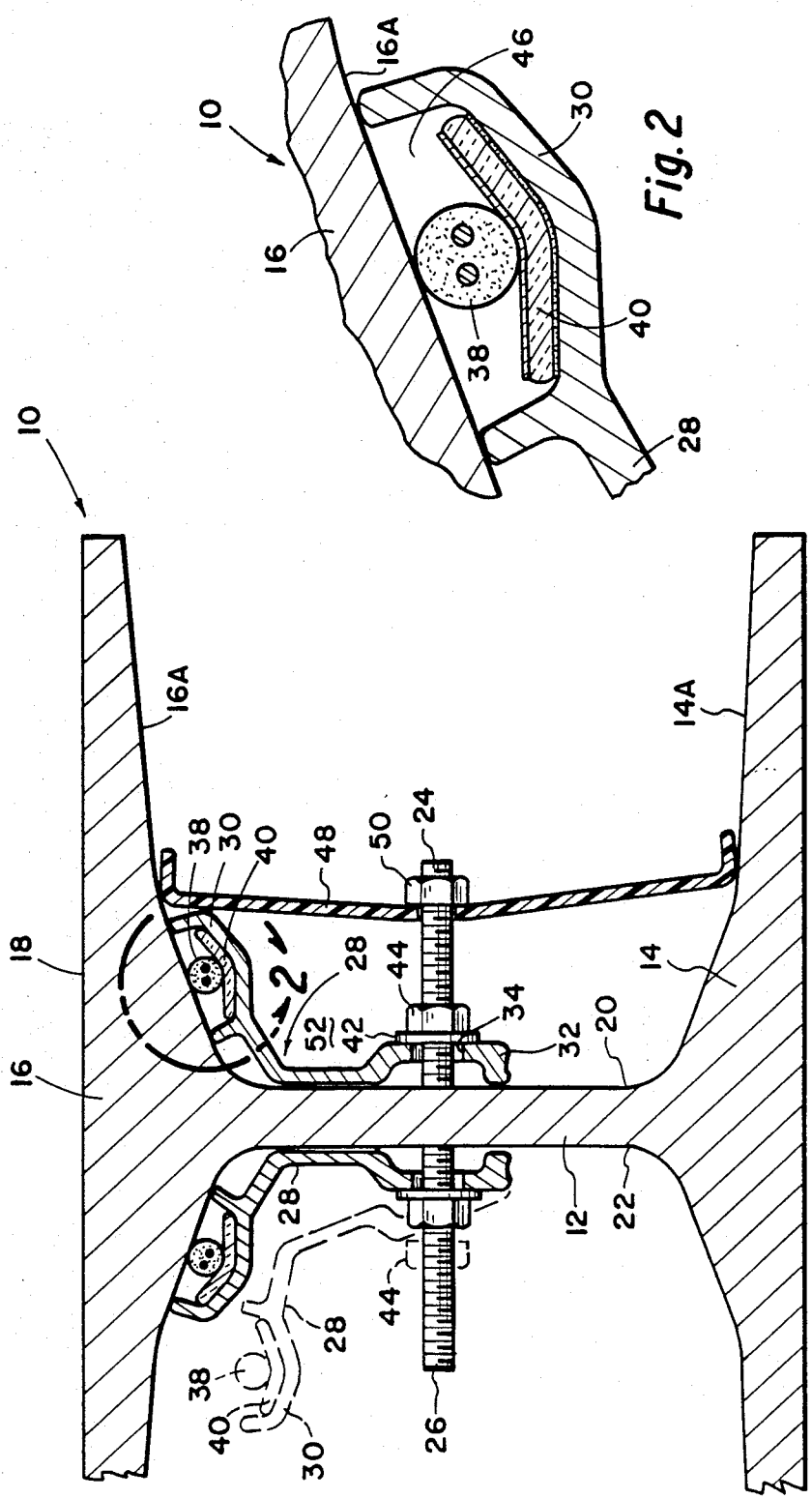

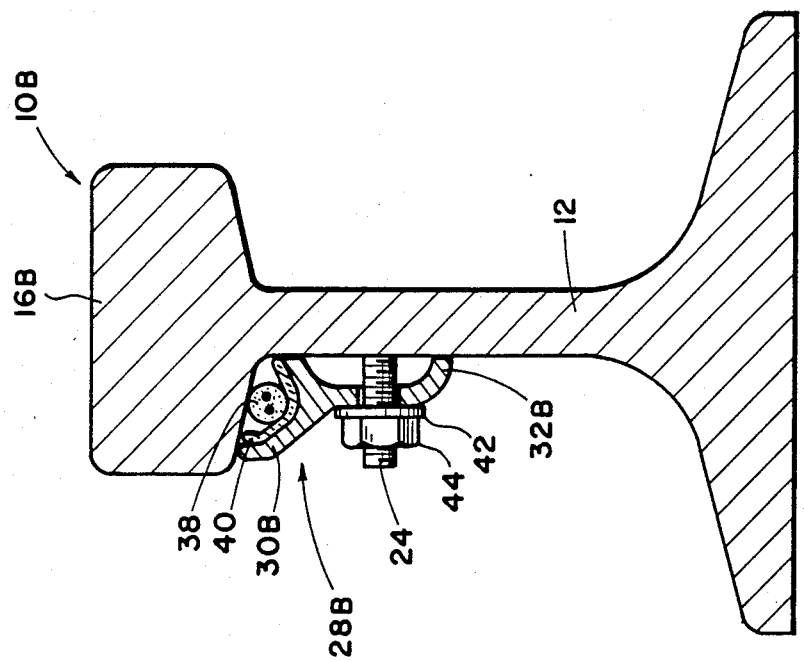
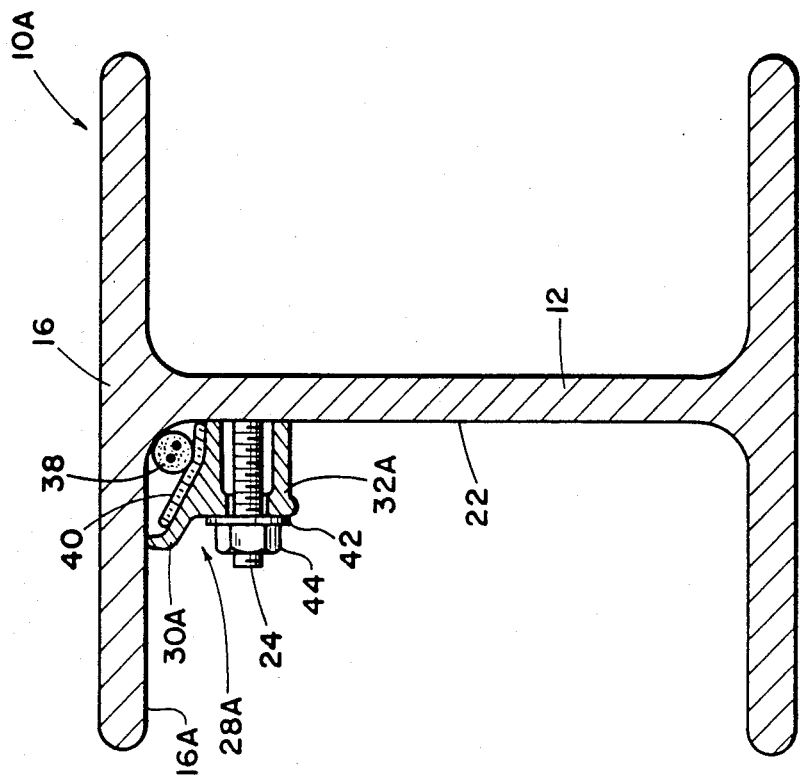

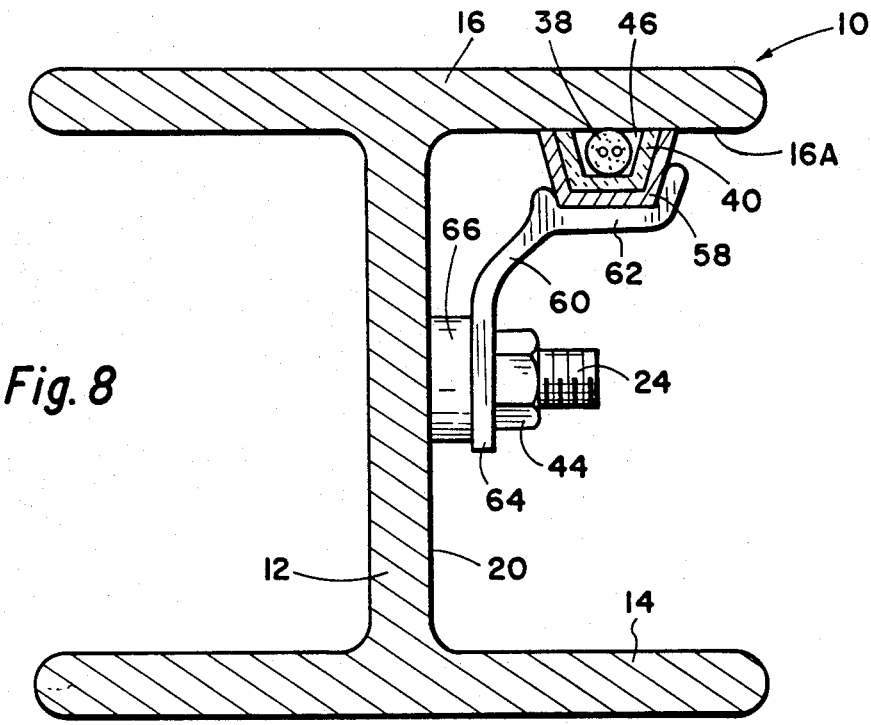
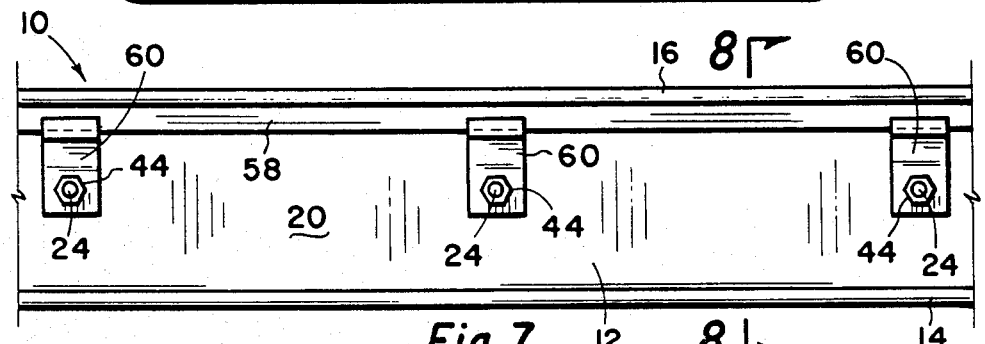
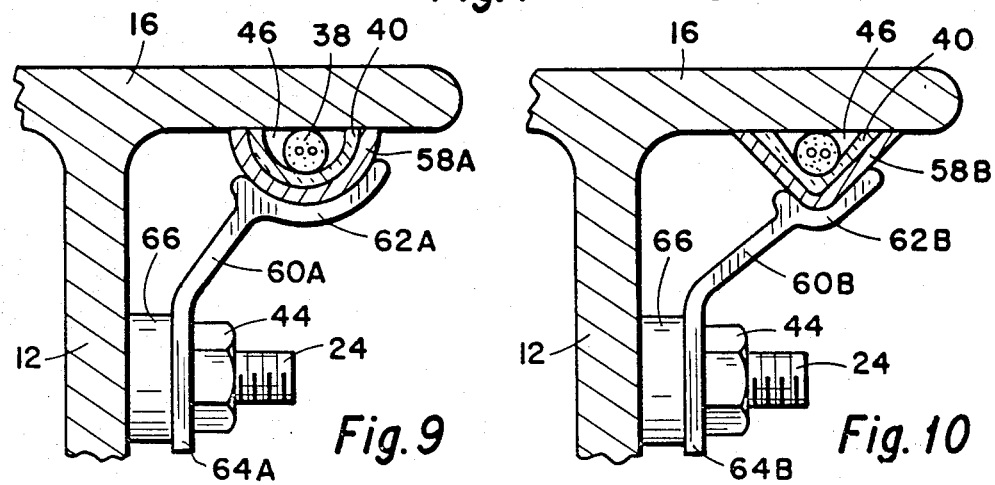

TRANSIT RAIL DEICING SYSTEM

SUMMARY OF THE INVENTION

In recent years increased usage has been made of rail systems utilizing electrical energy conducted by the rails themselves. These systems eliminate the need for supplementary current carrying conductors. Such are frequently employed in large metropolitan airports for moving people between terminals or from terminals to parking areas. Ice formation on the rails of such transit systems is a problem since ice disrupts power to the conveyance vehicle.

The present disclosure is an improved system for reducing ice accumulation on rails.

The most common means of reducing the accumulation of ice on rails is to apply heat to the rails by the attachment of an electric heating cable to the rails. A common means of securing a heating cable to a rail has employed the use of adhesive. Effective attachment of a heater cable to a rail by adhesive is very difficult. This method requires that the portion of the rail to receive the attachment of the heating cable be cleaned thoroughly such as with a wire brush and then wiped with a solvent. Thereafter the adhesive must be applied within a relatively few hours before oxidation of the metal re-occurs. The installation of a heating cable by adhesive is particularly sensitive to high humidity and to low temperatures. For these reasons, attaching a heating cable to a rail by adhesive has proven to be expensive and unreliable.

Another method which has been used employs spring-type clips which are attached to the base portion of the rail and which have an integral portion extending from the base portion up along one side of the rail web portion. The resiliency of the spring-type clip is used to hold an electric heating cable in position against the underneath surface of the rail top portion. These spring-type clips have also not proven to be reliable. The tension available from such spring-type clip to force contact of the heating cable with the rail is usually insufficient to accomplish effective heat transfer.

The present disclosure overcomes the limitations of the existing attachment systems by providing a much more effective, dependable and economical system for holding an electric cable in contact with a rail. The system employs the use of retention means or members such as threaded studs. These threaded studs are attached to one side of the rail web portion such as by means of spot welding, drilling and tapping or explosive driving. The employment of studs is important in that they provide a strong, permanent and dependable base element for supporting other elements necessary to retain the electric heating cable in contact with the rail.

One embodiment of the system of this invention includes the use of a series of elongated carrier members each defined in cross-section normal to the length thereof by an upper trough-forming portion and a lower clamping portion. The clamping portion has openings spaced along the length thereof in register with and arranged to receive studs extending from the rail.

A heating cable is then positioned within the carrier member's trough portions. Thereafter, a locking means, such as a nut and most preferably a nut and washer, are used on the studs to retain the trough-forming portion and thereby the heating cable therein in close proximity to the rail top portion.

One embodiment employs the use of a series of elongated trough members adaptable for fitting in end-to-end relationship. The heating cable is received within the trough members. Brackets are employed at spaced intervals to hold the trough members in position. Each bracket is supported by a threaded stud affixed to the rail web portion. A nut is in use to retain each of the brackets securely in position on a stud to force the trough members and thereby the heating cable therein in contact with the rail upper portion.

By the use of the systems this invention a heating cable can be expeditiously secured in contact with a rail and placed in optimal position for transferring heat to the rail upper portion. The system can be installed by unskilled labor and the attachment system is substantially immune to failure. Further, the system is adaptable to easy replacement of the cable if necessary.

The invention will be better understood with reference to the following description and claims taken in conjunction with the attached drawings.

DESCRIPTION OF THE DRAWINGS

FIG. 1 is an elevational cross-sectional view of a rail of the type used for a mass transit conveyance and showing the use of the system of this invention for supporting an electric heating cable in contact with the lower surface of the rail upper portion. The right hand side of FIG. 1 shows the system as installed in cross-section and further shows the use of a wind shield positioned to provide a closed cavity along one side of the rail web portion to thereby increase the efficiency of the rail heating system. The left hand side of FIG. 1 shows in dotted outline the position of the carrier member to receive a cable therein and in solid outline where the carrier member secured to hold the cable in contact with the rail upper portion.

FIG. 2 is an enlarged partial view taken at 2—2 of FIG. 1 showing the heating cable secured in contact with the rail upper portion.

FIG. 3 is a cross-sectional view of a different rail and showing an alternate configuration of the carrier member.

FIG. 4 is an elevational cross-sectional view of a rail and showing a still different embodiment of the carrier member.

FIG. 7, 8 and 9 show an alternate embodiment of the invention. FIG. 7 is an elevational side view of a rail showing an elongated trough member secured to the underneath side of the rail upper portion.

FIG. 8 is an enlarged cross-sectional view taken along the line 8—8 of FIG. 7 showing the trough member in cross-section and an elevational view of a bracket member supporting the trough member. The heating cable is retained within the trough member.

FIG. 9 is a partial cross-sectional showing an alternate embodiment of the trough member and an alternate design for the bracket member.

FIG. 10 is a partial cross-sectional view showing an additional alternate embodiment of the trough member and the bracket member.

DESCRIPTION OF THE PREFERRED EMBODIMENTS

Figure 6:
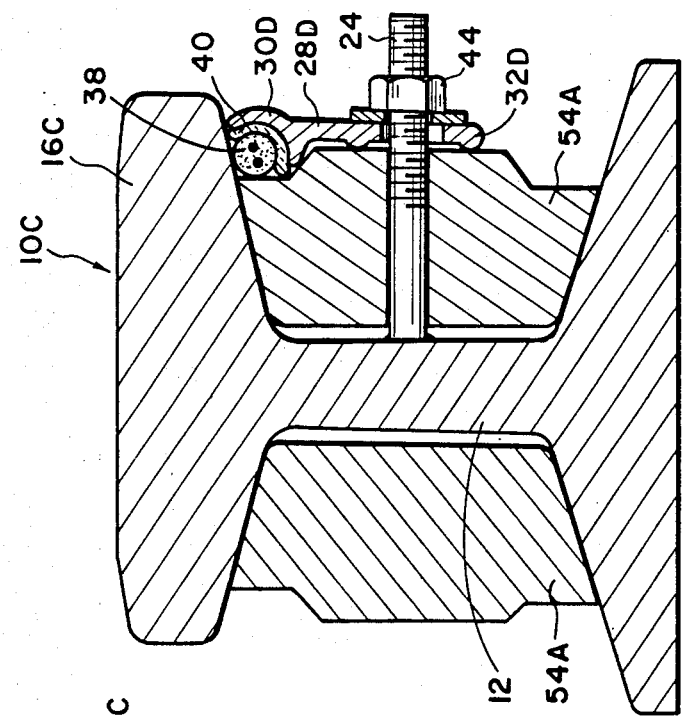
FIG. 6 shows an elevational cross-sectional view of a rail having current carrying members and showing another an alternate embodiment of the carrier member in which the heating cable is positioned at the intersection of the outer surface of the rail conductor portion and the rail upper portion.

Referring first to the FIGS. 1 and 2, a rail generally indicated by the numeral 10 is shown in elevational cross-sectional view, the rail being characteristic of one type used for mass transit. The rail provides a surface for the wheels of the transit vehicle to pass thereover and in some instances simultaneously provides a source of electrical energy for supplying energy for the vehicle. The rail includes an upright web portion 12, a base portion 14 and a top portion 16. The top portion 16 has an upper surface 18 on which the wheels of the vehicle roll and on which ice and snow tend to accumulate. An objective of the present disclosure is to provide an improved system to heat the rail top portion 16 so as to reduce the accumulation of snow and ice on the top surface 18.

Web portion 12 has opposed vertical surfaces 20 and 22. Affixed to surface 20 is a stud 24 and in like manner, affixed to surface 22 is a stud 26. The studs 24 and 26 can be affixed to web 12 in different ways. One means is by the use of welding, including spot welding so that the inner end of each of the studs 24 and 26 is welded to the corresponding web surfaces 20 and 22. Other means (not shown) includes drilling and tapping the web portion 12 so that the studs can be threaded into such tapped openings or the use of explosive driven studs.

Secured to stud 24 is an elongated carrier member generally indicated by the numeral 28, the carrier member being shown in cross-section. Carrier member 28 is in the form of an extrusion and may be of a any length which is convenient to handle, such as 10 feet. The carrier member 28 includes two basic integral portions, that is, an upward trough portion 30 and a lower retention portion 32. Retention portion 32 may also be referred to as a clamping portion. The retention portion 32 has openings 34 spaced along the length thereof. Openings 34 (only one of which is shown in the carrier member 28) may be spaced every two or three feet apart as an example and are spaced in register with studs 24 secured at the same intervals to the rail web portion 12.

Positioned in the carrier member top portion 30 is an electrically heated cable 38, which may be of the type generally used for industrial heating purposes and can be either a metal clad or plastic clad cable with resistive conductors therein. In some instances such heating cables are metal clad and are filled with mineral insulation. The particular type of heating cable is not relevant to this disclosure; however, providing an improved system of supporting the cale for effective transfer of heat from the cable to the rail top portion 16 is the essence of the invention.

Positioned within the trough portion 30 is an insulation strip 40 which may be in the form of an insulating tape having adhesive backing on one side.

The insulating strip 40 can be formed as an elongated strip of insulation material such as made of polyurethane, polystyrene, PVC form or the like. The bottom surface of the insulating backing can have an adhesive thereon so that it will readily adhere to the interior of the carrier member trough portion 30. In addition, the interior surface of the insulating strip can be provided with a foil cover.

The carrier member 28 is held in position by means of a washer 42 and nut 44.

As seen in FIG. 2, the carrier member trough portion 30 securely holds heating cable 38 indirect contact with the lower surface 16A of the rail upper portion 16. This permits direct heat transfer from the heating cable 38 to the rail upper portion 16. In addition, the trough portion 30 provides a substantially closed space 46 along each side of the cable 38 which space is heated by the cable by an oven effect and this heat of convection is also transferred to the rail upper portion 16. The use of insulation strip 40 reduces the transfer of heat from the cable 38 to the carrier member 28 to thereby concentrate the heat in the rail upper portion 16 rather than into the carrier member 28.

Referring to the left portion of FIG. 1, the carrier member 28 is shown in a downwardly tilted portion in dotted outline which is the normal position of the carrier member before nut 44 is tightened. It can be seen that in this attitude the trough portion 30 is open at the top. In this manner the cable 38 may be easily laid into the open trough along an extended length of rail. Thereafter as the nut 44 on each stud 26 is tightened, the carrier member moves the cable up into contact with the rail's upper portion 16. This illustrates the ease in use of the system of this invention. Further, FIG. 1 illustrates the ease by which cable 38 may be replaced if it develops an open circuit or for other reasons. All that is required is that nut 44 on each stud 26 be loosened along the length of the rail requiring a placement cable, allowing the carrier members 28 to be pivoted downwardly so that the trough is opened. The old cable then can be quickly removed and a new cable installed.

Referring again to the right side of FIG. 1, a wind shield 48 is shown affixed to stud 24 and held in position by nut 40. The wind shield contacts the underneath surface 16A of the rail upper portion 16 and the top surface 14A of the rail base portion 14 and provdes a closed space 52 between the shield and the rail web portion 12. This reduces air circulation and insures more efficient heat transfer from the heating cable 38 to the rail. While shown on only one side of the rail, typically they are placed on both sides of the rail when wind shields are used.

FIG. 3 shows an alternate embodiment of the invention in which the carrier member is of a different configuration. In FIG. 3 the carrier member generally indicated by the numeral 28A, is of shorter elevation in cross-section, but still includes a retention portion 32A and a trough portion 30A. The function of the carrier member of the configuration shown in FIG. 3 is the same as that shown with reference to FIGS. 1 and 2, however, the installation of the cable is different. In the embodiment of FIG. 2 the cable is first in position within the trough portion 30A of the carrier member and then the carrier member is inserted onto the spaced apart studs 24. Thereafter a washer 42 and a stud 44 is applied to stud 24 to retain cable 38 in contact with the rail. In the arrangement of FIG. 3 the cable 38 is held in contact in a favorable position, that is, at the juncture of the web inner surface and the top portion lower surface 16A.

FIG. 4 shows an alternate embodiment of the arrangement of FIG. 3 in which the rail is of a cross-sectional configuration more similar to that used for long distance rail systems in which the rail upper portion 16A is relatively thick and of less width compared to the web portion 12. The trough portion 30B of the carrier member 28B is configured somewhat differently as well as the retention portion 32B. Comparing FIGS. 1, 3 and 4 shows how the practice of the invention may employ carrier members having a variety of cross-sectional shapes.

Figure 5:
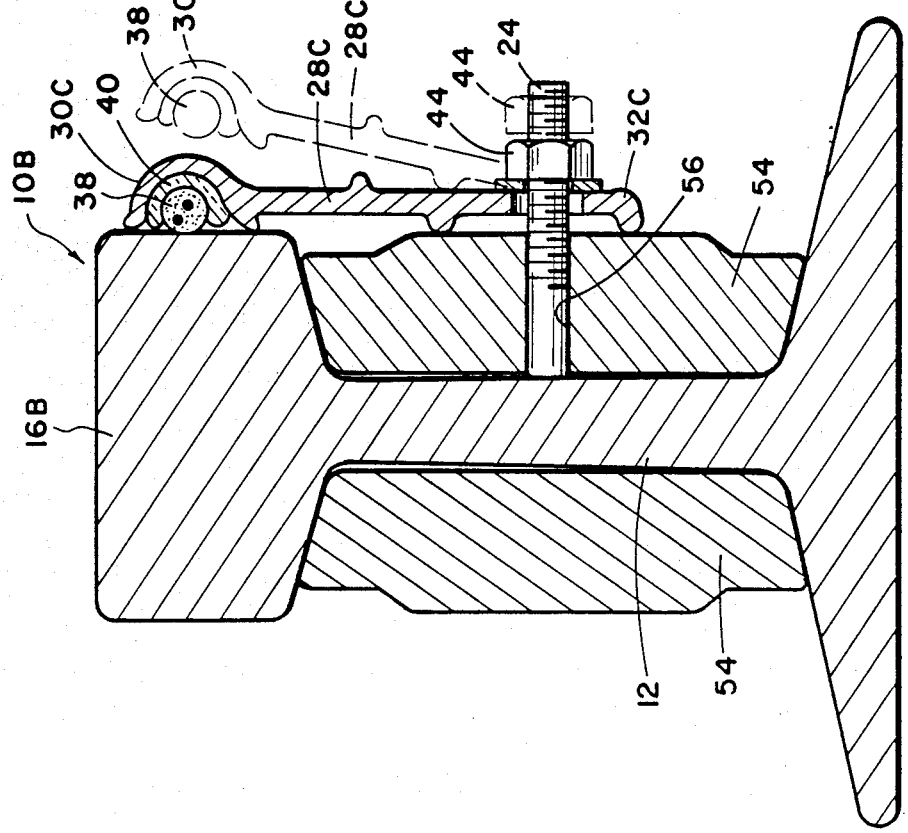
FIG. 5 is an elevational cross-sectional view of a rail which employs current carrying portions along each side of the rail web portion and showing the use of a carrier member for securing a heating cable in contact with one side of the rail upper portion.

Turning now to the FIGS. 5 and 6, still different arrangements of the invention are shown. FIG. 5 shows a rail generally indicated by 10B having essentially the same cross-sectional shape as that in FIG. 4, but showing a type of rail system in which supplemental conductor elements 54 are used along the rail web portion 12 to reduce the resistance drop of electricity conducted by the rail. These conductor portions 54 are typically made of aluminum and are positioned along the full length of the rail system. These conductor portions 54 are not part of the disclosure, but FIGS. 5 and 6 illustrate how the principles of the disclosure may be employed to provide the heat to a rail system which includes conductive portions. Stud 24 can be electrically welded to the web portion 22 by drilling a hole 56 through the conductor member 54. It is not necessary to remove the conductive member 54 since hole 56 can be drilled easily through it and stud 24 easily attached to the rail web portion 12 such as by spot welding. In addition, the studs can be attached by explosively driving the studs into the conductive member 54.

In FIG. 5 the carrier member 28C is of a still different cross-sectional configuration, but nevertheless retains a trough portion 30C and a lower retention portion 32C. The carrier 28C is shown in dotted outline as it is positioned before nut 44 is tightened showing how the cable 38 may be installed. Note that the insulating strip 40 is curved to fit the interior shape of the trough portion 30C.

FIG. 5 shows how the principles of this disclosure may be employed to secure a cable to the side of the rail upper portions 16 which is important when the use of the conductor members 54 prevent installing the cable so as to contact primarily the lower surface of the rail upper portion.

FIG. 6 shows an alternate embodiment of FIG. 5 and in which the rail 10C is of a different configuration. The conductor portions 54A are a slightly different shape. In this arrangement the carrier member 28B is configured so as to place cable 38 at the juncture between the upper exterior surface of the conductor member 54A and the lower surface of the rail upper portion 16C.

FIGS. 5 and 6 are illustrated by the way in which the principles of the disclosure can be adapted to rail systems which use supplementary conductor members 54, irrespective of the particular cross-sectional configuration of the rail or the conductor members.

Turning now to FIGS. 7 and 8, an alternate embodiment of the disclosure is shown. In FIG. 7 the system is shown in partial elevational view including a side view of the rail 10 which has a cross-sectional arrangement similar to that shown in FIG. 3. In this embodiment the heating cable is supported by a series of elongated trough members 58 which may be of any length convenient to handle, such as 10 feet. As shown in FIG. 8 the trough member 58 is in cross-section of an open-type trapezoidal shape. The trough member is held in position by spaced apart clip member 60 each of which is held in place by a stud 24 and nut 44.

As shown in cross-section in FIG. 8 the trough member 58 is configured substantially like the trough portion 30 shown in the embodiment illustrated in FIG. 1. Each trough member 58 is held in position by a plurality of clip members 60. Each clip member 60 is of relatively shorter length, such as 1 to 2 inches. Clip members 60 may typically be formed from an extrusion cut in such short lengths.

Each trough member 58 includes an insulating strip 40 as previously described with reference to the preceding embodiments which serve the same function previously described, that is, to insulate heating cable 38 from the trough and to thereby concentrate heat transfer into the rail upper portion 16.

FIGS. 9 and 10 show alternate embodiments. In FIG. 9 the trough member 58A is of semi-circular configuration and in FIGS. 10 the trough member 58B is of a V-shaped configuration. This illustrates that the cross-sectional configuration of the trough members may vary considerably. In each instance, the clip member is configured to complement the shape of the trough member for which it is designed. Specifically, trough support portions 62A in FIG. 9 and 62B in FIG. 10 each have a surface to mate with the external lower surface of the troughs 58A and 58B, respectively.

In FIGS. 8, 9 and 10, spacers 66 are provided, each of which has an opening therein (not shown) so that each spacer is received on a stud 24. The use of spacers 66 is exemplary since each clip member could be configured so as to eliminate the need of a spacer. In addition, the use of a spacer, or nonuse of the spacer, can control the placement of the area of contact of cable 38 with the rail top portion. As with the earlier embodiments, the use of the trough members provide a closed space 46 to improve the transfer of heat from the cable to the rail.

An important advantage of the embodiment of FIGS. 7 through 10 is that installation is simplified with respect to the placement of studs 24. In the earlier embodiment of FIG. 1 through 6, the studs must be coincident with the spacing of the openings 34 in the carrier members. While this can be easily achieved by placing the carrier member in position and marking through the openings 34 onto the rail web portion, the spot of attachment of the studs; any misalignment will make installation of the carrier members on the studs more difficult. In the embodiment of FIGS. 7 through 9 the studs 24 can be positioned indiscriminately as to specific spacing, between the studs, since positioning of the clip members 60 is not critical. All that is required is that the studs be placed at sufficient close intervals to hold the trough members 58 in close contact with the rail upper portion 16.

Important portions of this disclosure including carrier members 28, trough members 58 and clip members 60 are all ideally manufactured by extrusion. Such extrusions may be of metal, fiberglass, plastic, fiberglass reinforced plastic and so forth. The spacing between the clips in the embodiment of FIG. 7 will depend somewhat on the stiffness of the material of which the trough member 58 is made, since obviously the stiffer the trough member the less frequently it must be supported to ensure that the cable therein is held in close contact with the rail.

The embodiment of FIGS. 7 through 8 can be applied to the various rail configurations shown in FIGS. 1 through 6 and it can be seen taht the cable can be supported utilizing the principles of the embodiment of FIGS. 7 through 10 on the side of the rail as shown in FIG. 5 or at the juncture of the lower surface of the rail upper portion and the conductor member 54A as shown in FIG. 6.

The claims in the specification describe the invention presented and the terms that are employed in the claims draw their meaning from the use of such terms in the specification. The same terms employed in the prior lart may be broader in meaning than specfically employed herein. Whenever there is a question between the broader definition of such terms used in the prior art and the more specific use of the terms herein, the more specific meaning is meant.

While the invention has been described with a certain degree of particularly it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

We claim:

1. A system for use with a rail for carrying a moving conveyance, the rail having a web portion with opposed sides, a base portion and an increased width top portion, the system serving to provide means to heat the rail top portion to decrease the accumulation of snow and ice thereon, comprising:
   stud means secured at spaced intervals along at least one side of the rail web portion and below the rail top portion;
   a plurality of aligned elongated carrier members each defined in cross section normal the length thereof by an upper trough forming portion and a lower retention portion, the retention portion having openings spaced along the length thereof in register with and arranged to receive said studs;
   a heating cable received in said aligned carrier member's trough portions; and
   locking means on said stud means to retain each said carrier member in a first position wherein said trough forming portion is exposed to receive said heating cable therein and in a second position wherein said trough forming portion holds said heating cable in close proximity to the rail top portion.

2. A system according to claim 1 wherein each said stud means is secured by welding to the rail web portion.

3. A system according to claim 1 wherein each said stud means extends generally horizontally from the rail web portion.

4. A system according to claim 1 wherein each said stud means is externally threaded and wherein said locking means includes nut means.

5. A system according to claim 1 wherein said carrier members are each in the form of an elongated extruded member.

6. A system acording to claim 1 including insulating means between each said carrier member trough forming portion and said heating cable.

7. A system for use with a rail for carrying a moving conveyance, the rail having a vertical web portion with opposed sides, a base portion and an increased width horizontally extending top portion(,) having a lower surface, the system serving to provide means to heat the rail top portion to decrease the accumulation of snow or ice thereon, comprising:
   a plurality of aligned elongated trough members fitted in end-to-end relationship;
   heating cable means received in said aligned trough members;
   bracket members at spaced apart intervals supporting said aligned trough members; and
   retention members secured to the rail vertical web portion at spaced apart intervals in register with the said bracket members for retaining said bracket members and for thereby retaining said trough members and said heating cable means therein in close proximity to the lower surface of said rail top portion and spaced from the rail vertical web portion.

8. A system according to claim 7 wherein said retention means includes stud means each rigidly affixed at one end to the rail web portion.

9. A system according to claim 8 wherein said stud means each extends generally horizontally from the rail web portion.

10. A system according to claim 8 wherein each said stud means is externally threaded and wherein each said bracket means has an opening therein receiving a said threaded stud means, and including a nut means for retaining said bracket means on said threaded stud means.

11. A system according to claim 7 wherein each said trough member is in the form of an elongated extruded member.

12. A system according to claim 7 wherein each said trough member is, in cross-sections taken normal to the length thereof, of semi-circular open top configuration.

13. A system according to claim 7 wherein said trough member is, in cross-section taken normal to the length thereof, of V-shaped open top configuration.

14. A system according to claim 7 wherein each said trough member is, in cross-sections taken normal to the length thereof, of opened top quadrilateral configuration.

15. A system according to claim 7 including insulating means between each said trough member and said heating cable.

16. For use in a system for heating a rail of the type used for supporting a moving conveyance in which the rail has a web portion with opposed sides, a base portion and an increased width top portion in which a heating cable is held in close proximity to the rail top portion and in which the rail has retention means secured at spaced intervals along at least one side of the web portion, a means for supporting the heating cable comprising:
   a series of elongated carrier members each defined in cross-section normal the length hereof by an upper trough forming portion adaptable for receiving a heating cable therein and a lower integral clamping portion, the clamping portion having openings spaced along the length hereof in register with and for receiving the retention means, whereby each carrier member may be retained by the retention means in a first position wherein said trough forming portion is exposed to receive a heating cable therein and in a second position wherein said trough forming portion serves to support a heating cable position within said trough forming portion in close proximity to the rail upper portion.

17. A means for supporting a heating cable according to claim 16 including:
   insulating means within each said carrier members trough portion whereby the heating cable is insulated from said carrier members.

18. A means for supporting a heating cable according to claim 16 wherein said carrier members are formed of material having relatively low thermal conductivity.

* * * * *